(12) United States Patent
Lopez et al.

(10) Patent No.: US 9,275,123 B2
(45) Date of Patent: Mar. 1, 2016

(54) REPLICATING A SOURCE STORAGE SYSTEM

(71) Applicant: International Business Machines Corporation, Armonk, NY (US)

(72) Inventors: Marina V. Lopez, Tucson, AZ (US); Khang N. Nguyen, Vail, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 13/859,550

(22) Filed: Apr. 9, 2013

(65) Prior Publication Data
US 2014/0304224 A1 Oct. 9, 2014

(51) Int. Cl.
*G06F 17/30* (2006.01)
*G06F 3/06* (2006.01)

(52) U.S. Cl.
CPC .......... *G06F 17/30575* (2013.01); *G06F 3/065* (2013.01)

(58) Field of Classification Search
CPC ................................................. G06F 17/30575
USPC .......................................................... 707/610
See application file for complete search history.

(56) References Cited

U.S. PATENT DOCUMENTS

| 7,275,142 B1 * | 9/2007 | Schultz et al. ................. 711/162 |
| 2007/0233979 A1 * | 10/2007 | Beardsley et al. ............ 711/162 |
| 2012/0330892 A1 | 12/2012 | Benjamin et al. |
| 2013/0024640 A1 * | 1/2013 | Reed et al. ..................... 711/170 |
| 2013/0036212 A1 | 2/2013 | Jibbe et al. |

OTHER PUBLICATIONS

"HP StorageWorks Deduplication and replication solutions guide", Fourth edition, Apr. 2009, pp. 1-138.
HP D2D Backup Systems, Jun. 2012, pp. 1-131.

* cited by examiner

*Primary Examiner* — Apu Mofiz
*Assistant Examiner* — Cindy Nguyen
(74) *Attorney, Agent, or Firm* — Kunzler Law Group

(57) ABSTRACT

For replicating a source storage system, a scan module generates a source storage server description for each source storage server of the source storage system from a scan of the source storage system. The source storage server description includes a replication type and a source volume record for each source logical volume of the source storage server. A provision module determines a number of replicated instances of each source logical volume for a target storage system from the replication type. In addition the provision module generates a target storage server description for each target storage server of the target storage system from each source storage server description in response to the target storage system satisfying a target storage requirement.

20 Claims, 7 Drawing Sheets

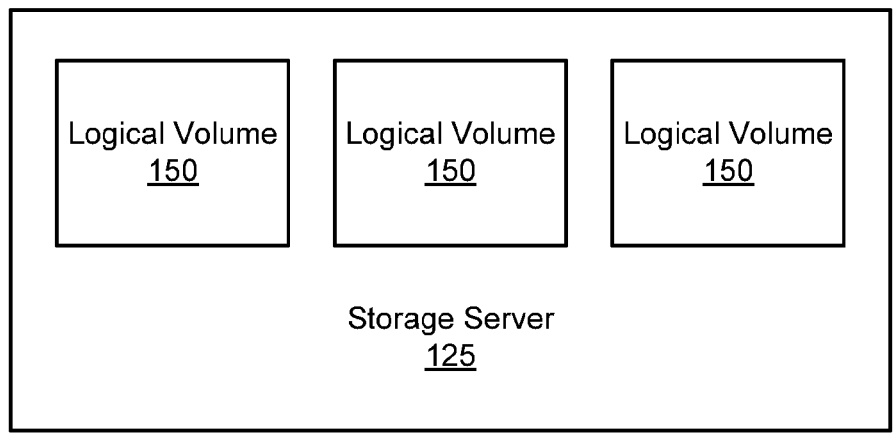
FIG. 3
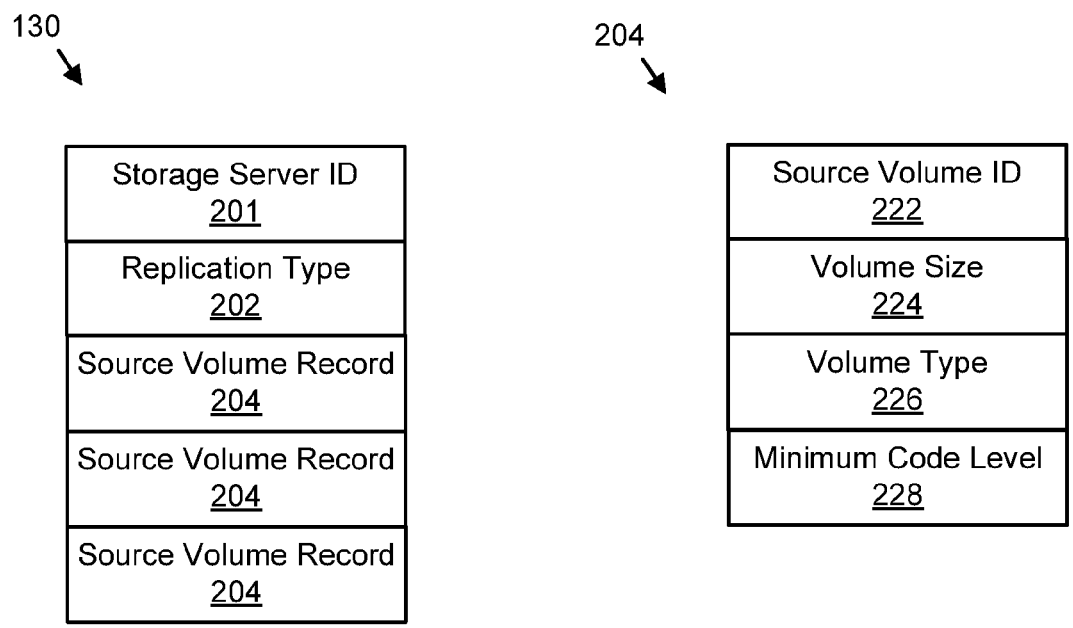
FIG. 4
FIG. 5

REPLICATING A SOURCE STORAGE SYSTEM

FIELD

The subject matter disclosed herein relates to storage systems and more particularly relates to replicating a source storage system.

BACKGROUND

Description of the Related Art

A target storage system may be provisioned in order to mirror a source storage system. However, the provisioning of the target storage system may be prone to configuration errors.

BRIEF SUMMARY

An apparatus for replicating a source storage system is disclosed. A scan module generates a source storage server description for each source storage server of the source storage system from a scan of the source storage system. The source storage server description includes a replication type and a source volume record for each source logical volume of the source storage server.

A provision module determines a number of replicated instances of each source logical volume for a target storage system from the replication type. The provision module further determines a target storage requirement from the replication type and the number of replicated instances of each source logical volume and determines a number of target storage servers from the target storage requirement and a target storage system description for a target storage system. In addition the provision module generates a target storage server description for each target storage server of the target storage system from the source storage server description in response to the target storage system satisfying the target storage requirement. A method and a computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a schematic block diagram illustrating one embodiment of a storage server;

FIG. 4 is schematic block diagram illustrating one embodiment of source storage server description;

FIG. 5 is a schematic block diagram illustrating one embodiment of a source volume record;

DETAILED DESCRIPTION

Figure 1:
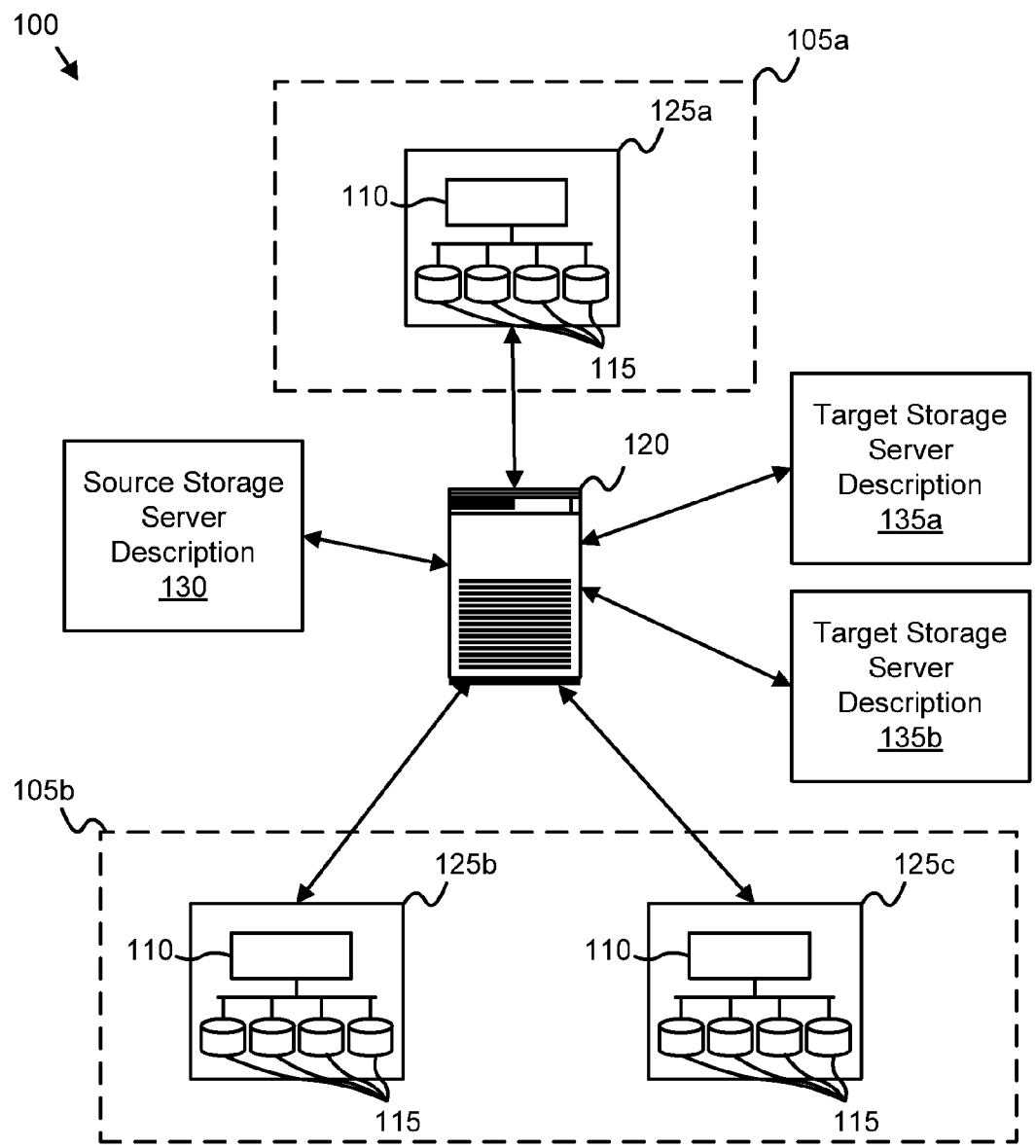
FIG. 1 is a schematic block diagram illustrating one embodiment of a replication system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a replication system 100. The system 100 includes one or more storage systems 105. Each storage system 105 may include one or more storage servers 125. Specified storage systems 105 may be source storage systems 105*a* while other storage systems 105 may be target storage systems 105*b*. A host 120 may replicate a source storage system 105*a* to a target storage system 105*b*.

Each storage server 125 may include a controller 110 and one or more storage devices 115. The storage devices 115 may be hard disk drives, magnetic tape devices, micromechanical storage devices, semiconductor storage devices, optical storage devices, and the like.

The target storage system 105b may be provisioned to mirror the source storage system 105a with a remote copy, a flash copy, and the like as will be described hereafter. In the past, properly provisioning the target storage system 105b has been time-consuming and prone to errors. Not only should the target storage system 105b have sufficient storage capacity to store the data of the source storage system 105a, but the target storage system 105b should also have sufficient storage capacity for additional instances of volumes of the source storage system 105a, practice volumes of the source storage system 105a, and the like.

In addition, the target storage system 105b should have storage devices 115 of the type and a device code level suitable for replicating the volumes of the source storage system 105a. Further, the target storage system 105b may benefit from an organization such as a division of data among the target storage servers 125b-c that is similar to the organization of the source storage servers 125a source storage system 105a.

The embodiments described herein generate a source storage server description 130 for each source storage server 125 in the source storage system 105b. The source storage server descriptions 130 are used to generate target storage server descriptions 135 for each target storage server 125b-c required for the target storage system 105b as will be described hereafter.

Figure 2:
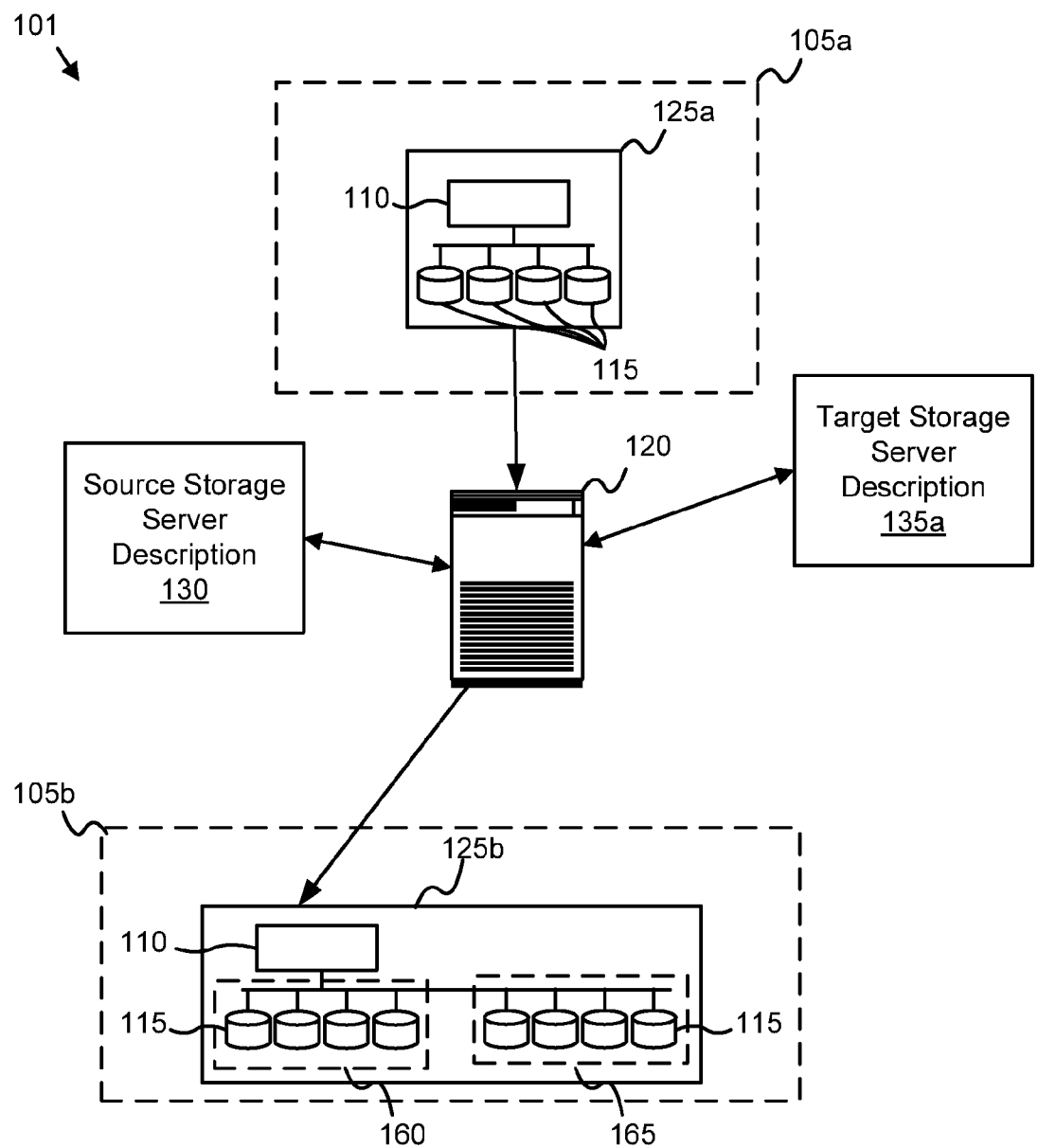
FIG. 2 is a schematic block diagram illustrating one alternate embodiment of a replication system.

FIG. 2 is a schematic block diagram illustrating one alternate embodiment of a replication system 101. The system 101 includes the source storage system 105a, the host 120, the source storage server description 130, and the target storage server description 135a of FIG. 1. The target storage system 105b is depicted with one target storage server 125b.

A first set of the storage devices 115 are organized as a point-to-point remote copy source 160. The data of the source storage system 105a may be copied to the storage devices 115 of the point-to-point remote copy source 160. The copy data in the point-to-point remote copy source 160 may be copied to a second set of storage devices 115 organized as a flash copy target 165.

FIG. 3 is a schematic block diagram illustrating one embodiment of a storage server 125. The storage server 125 may be a source storage server 125a or target storage server 125b-c. The storage capacity of the storage devices 115 in the storage server 125 may be organized into one or more logical volumes 150. Each logical volume 150 may include a portion of one or more storage devices 115. A portion of a storage device 115 may encompass up to all of the storage capacity of the storage device 115.

FIG. 4 is schematic block diagram illustrating one embodiment of the source storage server description 130 of FIGS. 1 and 2. The source storage server description 130 includes replication information for a specified source storage server 125a. The source storage server description 130 includes a storage server identifier 201 that uniquely identifies the source storage server 125a.

The source storage server description 130 also includes a replication type 202. The replication type 202 describes the type of replications of the source storage server 125b that will be created at the target storage system 105b. The replication type 202 may specify a remote copy of the source storage system 105a. In addition, the replication type 202 may specify a flash copy of the source storage system 105a.

In one embodiment, the replication type 202 specifies a number of replication instances of logical volumes 150 for the source storage system 105a. In addition, the replication type 202 may specify a number of practice volumes of the logical volumes 150. The source storage server description 130 also includes one or more source volume records 204. The source storage server description 130 may include a source volume record 204 for each source logical volume of the source storage server 125.

FIG. 5 is a schematic block diagram illustrating one embodiment of the source volume record 204 of FIG. 4. The source volume record 204 includes a source volume identifier 222. The source volume identifier 222 may uniquely identify the logical volume 150 of the source storage server 125a. The source volume record 204 also includes a volume size 224, a volume type 226, and a minimum code level 228.

The volume size 224 may be the data quantity stored in the logical volume 150. The volume size 224 may be measured in bytes such as gigabytes, terabytes, and the like. In one embodiment, the volume size 224 is a number of cylinders in the storage device 115.

The volume type 226 may specify performance requirements, service level requirements, storage device types, and the like. For example, the volume type 226 may specify a minimum latency for storage devices 115 storing data for the logical volume 150. Alternatively, the volume type 226 may specify a maximum access time and/or a minimum data transfer rate for storage devices 115 storing data for the logical volume 150.

The minimum code level 228 may specify a minimum level of firmware and/or other code for the storage devices 115 storing data for the logical volume 150. The minimum code level 228 may be a version number, a reference number, a code description, and the like.

Figure 6:
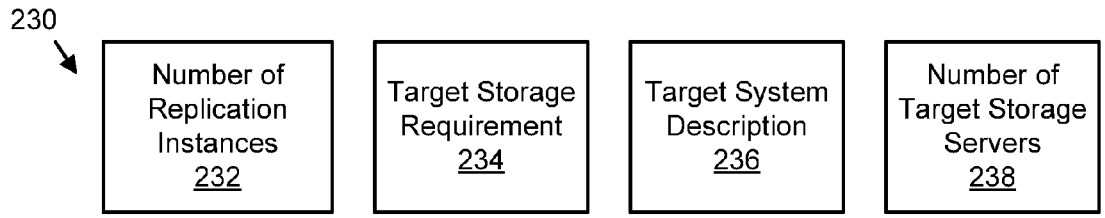
FIG. 6 is a schematic block diagram illustrating one embodiment of storage values.

FIG. 6 is a schematic block diagram illustrating one embodiment of storage values 230. The values 230 include a number of replication instances of source logical volumes 232, a target storage requirement 234, a target storage system description 236, and a number of target storage servers 238.

The number of replication instances of source logical volumes 232 may be included in the replication type 202. Alternatively, the number of replication instances of logical volumes 232 may be determined from the replication type 202. The number of replication instances of source logical volumes 232 may specify a number of replicated instances of a source logical volume 150 that are to be created on the target storage system 105b. For example, the number of replication instances of logical volumes 232 may specify that two replication instances of a source logical volume 150 be created on the target storage system 105b. In one embodiment, the number of replication instances of source logical volumes 232 specifies a number of replication instances for each logical volume 150.

The target storage requirement 234 may be determined from the replication type 202 and the number of replication instances of logical volumes 232 as will be described hereafter. For example, if the replication type 202 specifies a flash copy with one practice volume, the target storage requirement 234 may be at least twice the storage requirement for the source storage system 105a.

The target storage system description 236 may describe the target storage system 105b including the storage devices 115 of the target storage system 105b. In one embodiment, the target storage system description 236 is generated from the scan of the target storage system 105b. For example, the host 120 may query the target storage system 105b to identify each target storage server 125 in the target storage system 105b. The host 120 may further query each storage device 115 in each target storage server 125 to determine the target storage system description 236.

The number of target storage servers 238 may specify the number of target storage servers 125 needed for the target storage system 105b. The number of target storage servers 238 may be determined from the target storage requirement 234 and the target storage system description 236 as will be described hereafter.

Figures 7, 8:
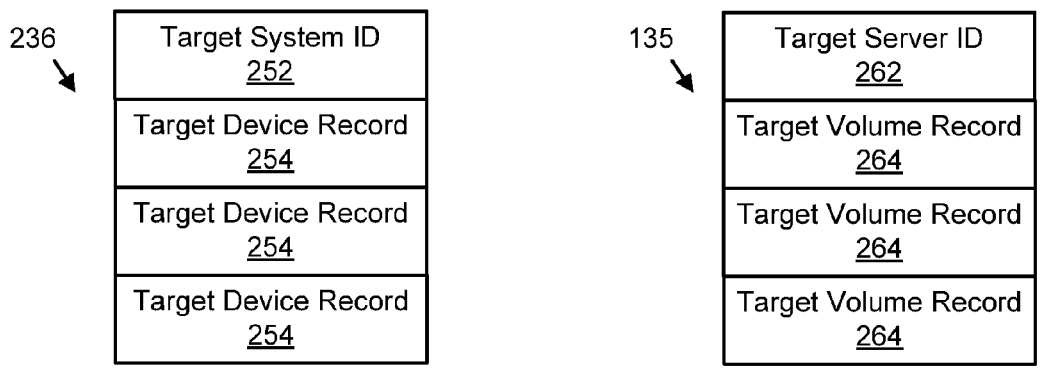
FIG. 7 is a schematic block diagram illustrating one embodiment of a target storage system description.
FIG. 8 is a schematic block diagram illustrating one embodiment of a target storage server description.

FIG. 7 is a schematic block diagram illustrating one embodiment of the target storage system description 236 of FIG. 6. The target storage system description 236 includes the target storage system identifier 252 that uniquely identifies the target storage system 105b. In addition, the target storage system description 236 may include a target device record 254 for each storage device 115 in the target storage system 105b. In one embodiment, each target device record 254 includes one or more of a unique identifier for the storage device 115, a storage capacity, a make, a model, a latency, a write data rate, and a read data rate.

FIG. 8 is a schematic block diagram illustrating one embodiment of the target storage server description 135. The target storage server description 135 is generated from the source storage server description 130 for each storage server 125 in the target storage system 105b. The target storage server description 135 may include a target server identifier 262. The target server identifier 262 may uniquely identify the target storage server 125 in the target storage system 105b. In addition, the target storage server description 135 may include one or more target volume records 264. In one embodiment, the target storage server description 135 includes a target volume record 264 for each target logical volume 150 in the corresponding target storage server 125b-c.

Figure 9:
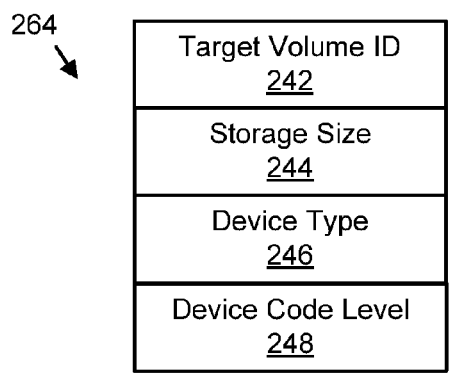
FIG. 9 is a schematic block diagram illustrating one embodiment of a target volume record.

FIG. 9 is a schematic block diagram illustrating one embodiment of the target volume record 264 of FIG. 8. The target volume record 264 describes a target logical volume 150 in the target storage system 105b. The target volume record 264 includes a target volume identifier 242, a storage size 244, a device type 246, and a device code level 248.

The target volume identifier 242 may uniquely identify the target logical volume 150 in the target storage system 105b. The target volume identifier 242 may be of volume number, a logical name, and the like. The storage size 244 may be the storage capacity of the portions of storage devices 115 in the logical volume 150. For example, the storage size 244 may be a sum of the storage capacities of the portions of the storage devices 115 of the target storage server 125b-c in the logical volume 150.

The device type 246 may identify a type of each storage device 115 included in the logical volume 150. In one embodiment, the device type 246 includes the information of the target device record 254. The device code level 248 may identify a code level for each storage device 115 included in the target logical volume 150. In one embodiment, the device code level 248 specifies capabilities of each storage device 115.

Figure 10:
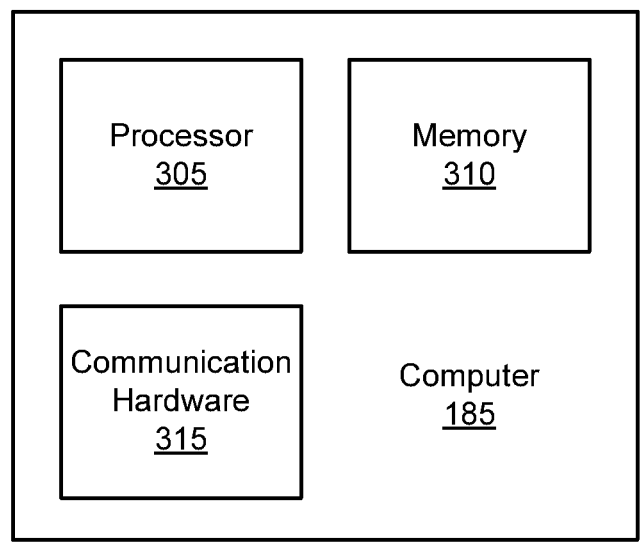
FIG. 10 is a schematic block diagram illustrating one embodiment of a computer.

FIG. 10 is a schematic block diagram illustrating one embodiment of a computer 185. The computer 185 may be the host 120. Alternatively, the computer 185 may be a controller 110 of the storage server 125, a storage server 125 and the like. The computer 185 includes a processor 305, a memory 310, and communication hardware 315. One of skill in the art will recognize that the computer 185 may include other components. The memory 310 stores program code. The memory 310 may be a hard disk drive, a semiconductor storage device, an optical storage device, a micromechanical storage device, and the like. The processor 305 may execute the program code. The communication hardware 315 may communicate with other devices.

Figure 11:
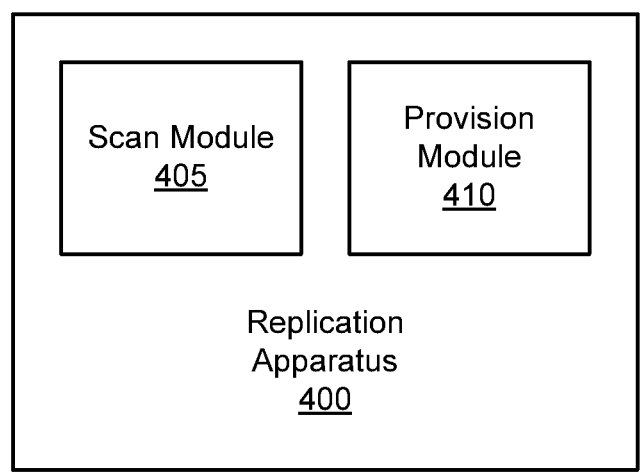
FIG. 11 is a schematic block diagram illustrating one embodiment of a replication apparatus.

FIG. 11 is a schematic block diagram illustrating one embodiment of a replication apparatus 400. The replication apparatus 400 may be embodied in the computer 185 of FIG. 10. The apparatus 400 includes a scan module 405 and a provision module 410. The scan module 405 and the provision module 410 comprise one or more of hardware and executable code, the executable code stored on one or more computer readable storage media such as the memory 310.

The scan module 405 may generate the source storage server description 130 for each source storage server 125 of the source storage system 105a from a scan of the source storage system 105a. The source storage server description 130 may include the replication type 202 and a source volume record 204 for each source logical volume 105 of the source storage server 125a.

The provision module 410 may determine the number of replicated instances of each source logical volume 232 from the replication type 202. In addition, the provision module 410 determines the target storage requirement 234 from the replication type 202 and the number of replicated instances of each source logical volume 232. The provision module 410 may further determine the number of target storage servers 238 from the target storage requirement 234 and the target storage system description 236 for the target storage system 105b. In addition, the provision module 410 may generate the target storage server description 135 for each target storage server 125 of the target storage system 105b from each source storage server description 130. The provision module 410 may generate the target storage server description 135 in response to the target storage system 105b satisfying the target storage requirement 234.

Figure 12A:
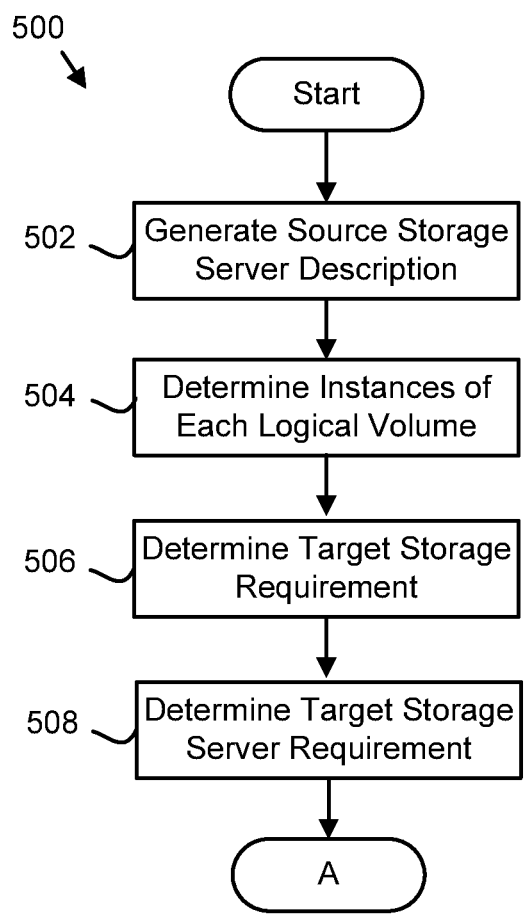
FIGS. 12A-B re schematic flow chart diagrams illustrating one embodiment of a replication method.
Figure 12B:
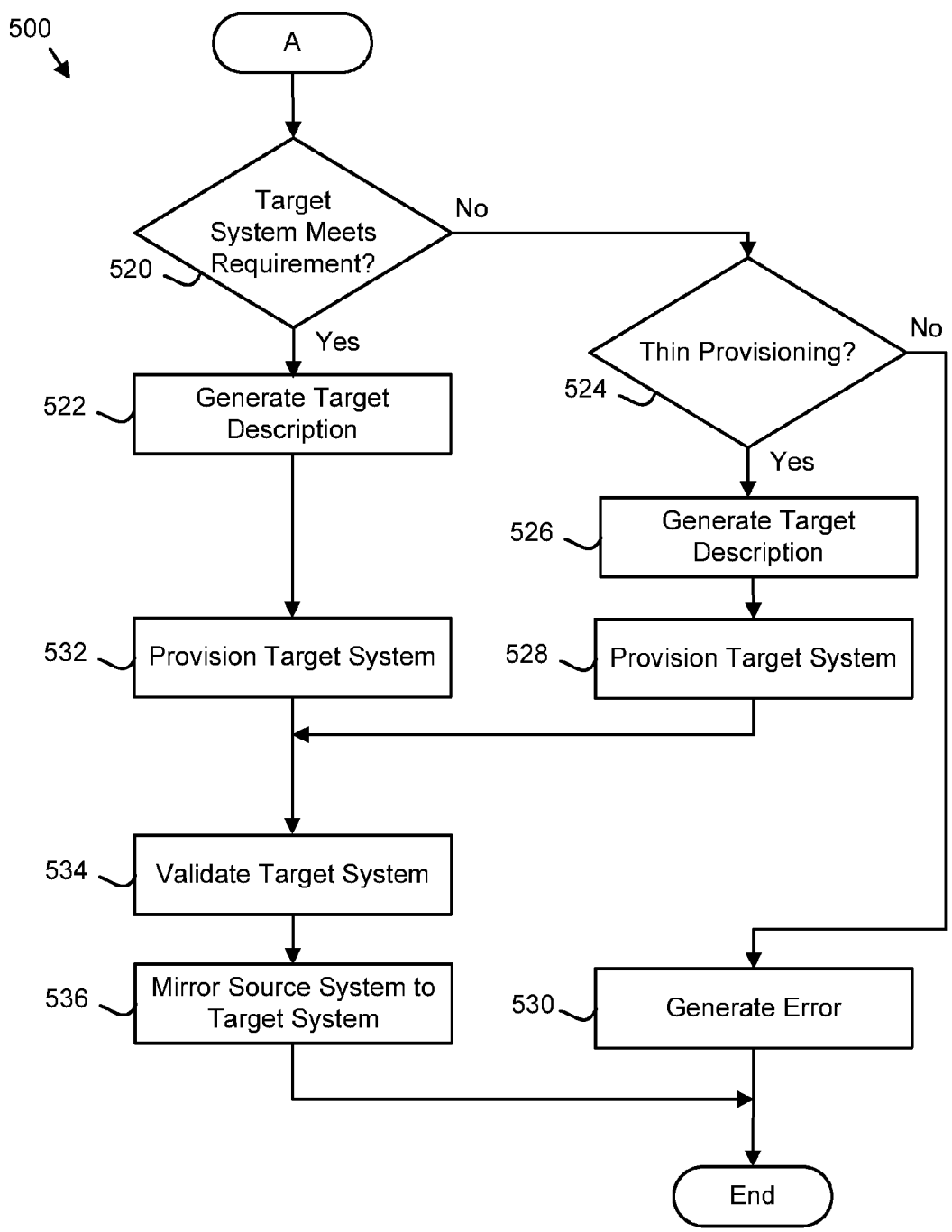

FIGS. 12A-B are schematic flow chart diagrams illustrating one embodiment of a replication method 500. The method 500 may be performed by the systems 100, 101 and the apparatus 400. In one embodiment, the method 500 is performed by the processor 305. Alternatively, the method 500 is performed by a computer program product comprising a computer readable storage medium such as the memory 310. The computer readable storage medium may store program code. The program code may be readable/executable by the processor 305 to perform the functions of the method 500.

The method 500 starts, and in one embodiment, the scan module 405 generates 502 the source storage server description 130 for each source storage server 125 of the source storage system 105a from a scan of the source storage system 105a. The source storage server description 130 may include the replication type 202 and a source volume record 204 for each source logical volume 105 of the source storage server 125a. The scan module 405 may query each source storage server 125a in the source storage system 105a and identify each storage device 115 and each source logical volume 150 in each source storage server 125a. The scan module 405 may further query source logical volume 150 and each storage device 115 and organize the responses to the queries in the source storage server description 130.

The provision module 410 may determine 504 the number of replicated instances of each source logical volume 232 from the replication type 202. For example, the provision module 410 may determine 504 that at least two replication instances are required for each flash copy and one replication instances is required for each remote copy. The provision module 410 may add additional replication instances for each practice copy.

The provision module 410 may determine 506 the target storage requirement 234 from the replication type 202 and the number of replicated instances of each source logical volume 232. In one embodiment, the target storage requirement 234 TSR is calculated using equation 1, where RI is the number of replicated instances of each source logical volume 232, DQ is the data quantity of source storage system 105a, and K is a constant.

$$TSR = RI * DQ * (1+K) \qquad \text{Equation 1}$$

In one embodiment, the target storage requirement 234 TSR is calculated from a sum of the volume size 224 VS for each source logical volume 150 using equation 2.

$$TSR = \Sigma RI * VS \qquad \text{Equation 2}$$

The provision module 410 may further determine 508 the number of target storage servers 238 from the target storage requirement 234 and the target storage system description 236 for the target storage system 105b. In one embodiment, the provision module 410 adds target storage servers 125b-c to the target storage system 105b until the storage capacity of the target storage system 105b is greater than the target storage requirement 234.

The provision module 410 may determine 520 if the target storage system 105b meets the target storage requirement 234. In one embodiment, the target storage system 105b satisfies the target storage requirement 234 if the storage devices 115 of the target storage system 105b provide a storage size 244 compatible with the volume size 224 of each source volume record 204, a device type 246 compatible with the volume type 226 of each source volume record 204, and a device code level 248 compatible with the minimum code level 228 of each source volume record 204. As used herein, a storage size 244, a device type 246, and device code level 248 is compatible by satisfying minimum requirements of the volume size 224, volume type 226, and minimum code level 228 respectively.

If the target storage system 105b does not satisfy the target storage requirement 234, the provision module 410 may determine 524 if the target storage system 105b may be provisioned with thin provisioning. In one embodiment, the replication type 202 specifies if the target storage system 105b may be provisioned with thin provisioning. If the target storage system 105b may not be provisioned with thin provisioning, the provision module 410 generates 530 an error and the method 500 ends.

If the target storage system 105b may be provisioned with thin provisioning, the provision module 410 may generate 526 the target storage server description 135 with thin provisioning for each target storage server 125 of the target storage system 105b from the source storage server description 130. The provision module 410 may generate 526 target storage server descriptions 135 corresponding to the number of target storage servers 238. For example, if the number of target storage servers 238 specifies three target storage servers 125, the provision module 410 generates three target storage server descriptions 135.

For each target storage server description 135, the provision module 410 generates a target volume record 264 that corresponds to each source volume record 204 in the source storage server description 130. The device type 246 of each target volume record 264 may be determined from the volume type 226 for the corresponding source volume record 204. In one embodiment, the device type 246 is equivalent to the volume type 226. Alternatively, the volume type 226 may access a type lookup table to determine the device type 246. In one embodiment, the type lookup table is modified to favor the storage devices 115 and device types 246 of the target storage system description 236.

The device code level 248 of each target volume record 264 may be determined from the minimum code level 228 for the corresponding source volume record 204. In one embodiment, the device code level 248 is equivalent to the minimum code level 228. Alternatively, the minimum code level 228 may access a code lookup table to determine the device code level 248. In one embodiment, the code lookup table is modified to favor the storage devices 115 and device code levels 248 of the target storage system description 236.

In one embodiment, a thinly provisioned logical volume 150 on a target storage server 125b-c has less storage capacity that is required to completely mirror a corresponding logical volume 150 on the source storage server 125a. The thinly provisioned logical volume 150 may be an open volume with a fixed block.

For example, the storage size 244 of a target volume record 264 in the target storage server description 135 may be set to a percentage of the volume size 224 of the corresponding logical volume 150 on the source storage system 105a. Alternatively, the storage size 244 for the target volume record 264 in the target storage server description 135 may be calculated as a function of the volume size 224. For example, the storage size 244 SS may be calculated using equation 3, where VS is the volume size 224 of a source logical volume 150, W is an average number of writes to the logical volume 150 on the source storage system 105a per specified write interval, and L is a constant. In one embodiment, L is 0.15.

$$SS = VS * (1-L) \qquad \text{Equation 3}$$

The provision module 410 may further provision 528 the target storage system 105b with less than the target storage requirement 234 if the target storage system 105b does not satisfy the target storage requirement 234. The provision module 410 may provision each target storage server 125b-c according to the target storage server description 135 for the target storage server 125b-c. The provision module 410 may provision the storage devices 115 of each target storage server 125 according to the device type 246 and the device code level 248. In one embodiment, the storage capacity of the storage devices 115 for each logical volume 150 in the target storage system 105b is provisioned with the percentage of the volume size 224 of the corresponding logical volume 150 in the source storage system 105a.

If the target storage system 105b satisfies the target storage requirement 234, the provision module 410 may generate 522 the target storage server description 135 for each target storage server 125 of the target storage system 105b from each corresponding source storage server description 130. The provision module 410 may generate 522 target storage server descriptions 135 corresponding to the number of target storage servers 238. For example, if the number of target storage servers 238 specifies two target storage servers 125, the provision module 410 generates 522 two target storage server descriptions 135. The target storage server description 135 may comprise at least two target volume records 264 for at least two target logical volumes 150 for each source logical volume 150 of a source storage system 105a for a flash copy replication type 202. The target storage server description 135 may comprise one target volume record 264 for one target logical volumes 150 for each source logical volume 150 of a source storage system 105a for a remote copy replication type 202.

For each target storage server description 135, the provision module 410 generates a target volume record 264 that corresponds to each source volume record 204 in the source storage server description 130. The device type 246 of each target volume record 264 may be determined from the volume type 226 for the corresponding source volume record 204. In one embodiment, the device type 246 is equivalent to the volume type 226. Alternatively, the volume type 226 may access the type lookup table to determine the device type 246.

The device code level 248 of each target volume record 264 may be determined from the minimum code level 228 for the corresponding source volume record 204. In one embodiment, the device code level 248 is equivalent to the minimum code level 228. Alternatively, the minimum code level 228 may access the code lookup table to determine the device code level 248.

In one embodiment, the storage size 244 of the target volume record 264 is at least equal to the volume size 224 of the source volume record 204 corresponding to the target volume record 264. In one embodiment, the target storage server description 125 is the source storage server description 130 of a corresponding source storage server 105a for a remote copy replication type 202. In a certain embodiment, a storage size 224 of target logical volumes 150 assigned to each target storage server 125b-c is proportional to the volume size 224 of source logical volumes 150 on two or more source storage servers 125.

The provision module 410 may provision 532 each target storage server 125b-c according to the target storage server description 135 for the target storage server 125b-c. For example, each target logical volume 150 in the target storage server 125b-c may be allocated storage devices 115 that provide a storage capacity that is at least equal to the storage size 244 of the target volume record 264. The provision module 410 may provision the storage devices 115 of each target storage server 125 according to the device type 246 and the device code level 248. For example, the provision module 410 may provisional a first storage device 115 to conform to the device type 246. Similarly, the provision module 410 may provision the first storage device 115 to conform to the device code level 248 by modifying the code for the first storage device 115 according to the device code level 248.

In one embodiment, the provision module 410 validates 534 that the target storage system 105b is provisioned in accordance with the target storage server description 234. The provision module 410 may scan the target storage system 105b and compare the results of the scan with each target storage server description 135 for the target storage system 105b. The provision module 410 may validate 534 the target storage system 105b if the results of the scan match the target storage server descriptions 135.

The host 120 may mirror 536 the source storage system 105a to the target storage system 105b and the method 500 ends. In one embodiment, the host 120 mirrors 536 the source storage system 105a according to the replication type 202. By generating the source storage server description 130 and using the source storage server description 130 to generate target storage server descriptions 135 for each target storage server 125 and provisioning the target storage servers 125b-c according to the target storage server descriptions 135, the target storage system 105b may be rapidly and accurately provisioned.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a scan module generating a source storage server description for each source storage server of a source storage system from a scan of the source storage system, each source storage server description comprising a replication type and a source volume record for each source logical volume of the source storage server; and
a provision module determining a number of replicated instances of each source logical volume for a target storage system from the replication type, determining a target storage requirement from the replication type and the number of replicated instances of each source logical volume, determining a number of target storage servers from the target storage requirement and a target storage system description for a target storage system, and generating a target storage server description for each target storage server of the target storage system from each corresponding source storage server description in response to the target storage system satisfying the target storage requirement, wherein the target storage system satisfies the target storage requirement if storage devices of the target storage system are device code level compatible with a minimum code level of each source volume record and at least a portion of the scan module and the provision module comprise one or more of hardware and executable code, the executable code stored on one or more computer readable storage media.

2. The apparatus of claim 1, wherein each source volume record comprises a volume size, a volume type, and the minimum code level.

3. The apparatus of claim 2, wherein the target storage system further satisfies the target storage requirement if the storage devices of the target storage system provide a storage size compatible with the volume size of each source volume record, and a device type compatible with the volume type of each source volume record.

4. The apparatus of claim 1, further comprising provisioning the target storage system in accordance with the target storage server descriptions for each target storage server of the target storage system.

5. The apparatus of claim 1, the provisioning module further:
generating each target storage server description with thin provisioning for each target storage server of the target storage system from each source storage server description in response to the target storage system not satisfying the target storage requirement; and
provisioning the target storage system with less than the target storage requirement if the target storage system does not satisfy the target storage requirement.

6. A method for replicating a source storage system comprising:
generating, by use of a processor, a source storage server description for each source storage server of a source storage system from a scan of the source storage system, each source storage server description comprising a replication type and a source volume record for each source logical volume of the source storage server;
determining a number of replicated instances of each source logical volume for a target storage system from the replication type;
determining a target storage requirement from the replication type and the number of replicated instances of each source logical volume;
determining a number of target storage servers from the target storage requirement and a target storage system description for a target storage system; and
generating a target storage server description for each target storage server of the target storage system from each corresponding source storage server description in response to the target storage system satisfying the target storage requirement, wherein the target storage system satisfies the target storage requirement if storage devices of the target storage system are device code level compatible with a minimum code level of each source volume record.

7. The method of claim 6, wherein each source volume record comprises a volume size, a volume type, and the minimum code level.

8. The method of claim 7, wherein the target storage system further satisfies the target storage requirement if the storage devices of the target storage system provide a storage size compatible with the volume size of each source volume record, and a device type compatible with the volume type of each source volume record.

9. The method of claim 6, further comprising provisioning the target storage system in accordance with the target storage server descriptions for each target storage server of the target storage system.

10. The method of claim 6, further comprising:
generating each target storage server description with thin provisioning for each target storage server of the target storage system from each source storage server description in response to the target storage system not satisfying the target storage requirement; and
provisioning the target storage system with less than the target storage requirement if the target storage system does not satisfy the target storage requirement.

11. The method of claim 6, wherein the replication type specifies a number of remote copies of the source storage system, a number of flash copies of the source storage system, and a number of practice volumes for the source storage system.

12. The method of claim 6, wherein the target storage server description is the source storage server description for a corresponding source storage server for a remote copy replication type.

13. The method of claim 6, wherein the target storage server description comprises at least two target logical volumes for each source logical volume of a source storage system for a flash copy replication type.

14. The method of claim 6, further comprising validating that the target storage system is provisioned in accordance with the target storage server description and mirroring the source storage system to the target storage system.

15. The method of claim 6, wherein the volume size is a number of cylinders.

16. The method of claim 6, wherein a storage size of target logical volumes assigned to each target storage server is proportional to the volume size of source logical volumes on two or more source storage servers.

17. A computer program product for replicating a source storage system, the computer program product comprising a non-transitory computer readable storage medium having program code embodied therein, the program code readable/executable by a processor to:
generate a source storage server description for each source storage server of a source storage system from a scan of the source storage system, each source storage server description comprising a replication type and a source volume record for each source logical volume of the source storage server;
determine a number of replicated instances of each source logical volume for a target storage system from the replication type;
determine a target storage requirement from the replication type and the number of replicated instances of each source logical volume;
determine a number of target storage servers from the target storage requirement and a target storage system description for a target storage system; and
generate a target storage server description for each target storage server of the target storage system from each corresponding source storage server description in response to the target storage system satisfying the target storage requirement, wherein the target storage system satisfies the target storage requirement if storage devices of the target storage system are device code level compatible with a minimum code level of each source volume record.

18. The computer program product of claim 17, wherein each source volume record comprises a volume size, a volume type, and a minimum code level and the target storage system further satisfies the target storage requirement if the storage devices of the target storage system provide a storage size compatible with the volume size of each source volume record, and a device type compatible with the volume type of each source volume record.

19. The computer program product of claim 17, further comprising provisioning the target storage system in accordance with the target storage server descriptions for each target storage server of the target storage system.

20. The computer program product of claim 17, further comprising:
generating each target storage server description with thin provisioning for each target storage server of the target storage system from each source storage server description in response to the target storage system not satisfying the target storage requirement; and
provisioning the target storage system with less than the target storage requirement if the target storage system does not satisfy the target storage requirement.

* * * * *